United States Patent Office 3,479,386
Patented Nov. 18, 1969

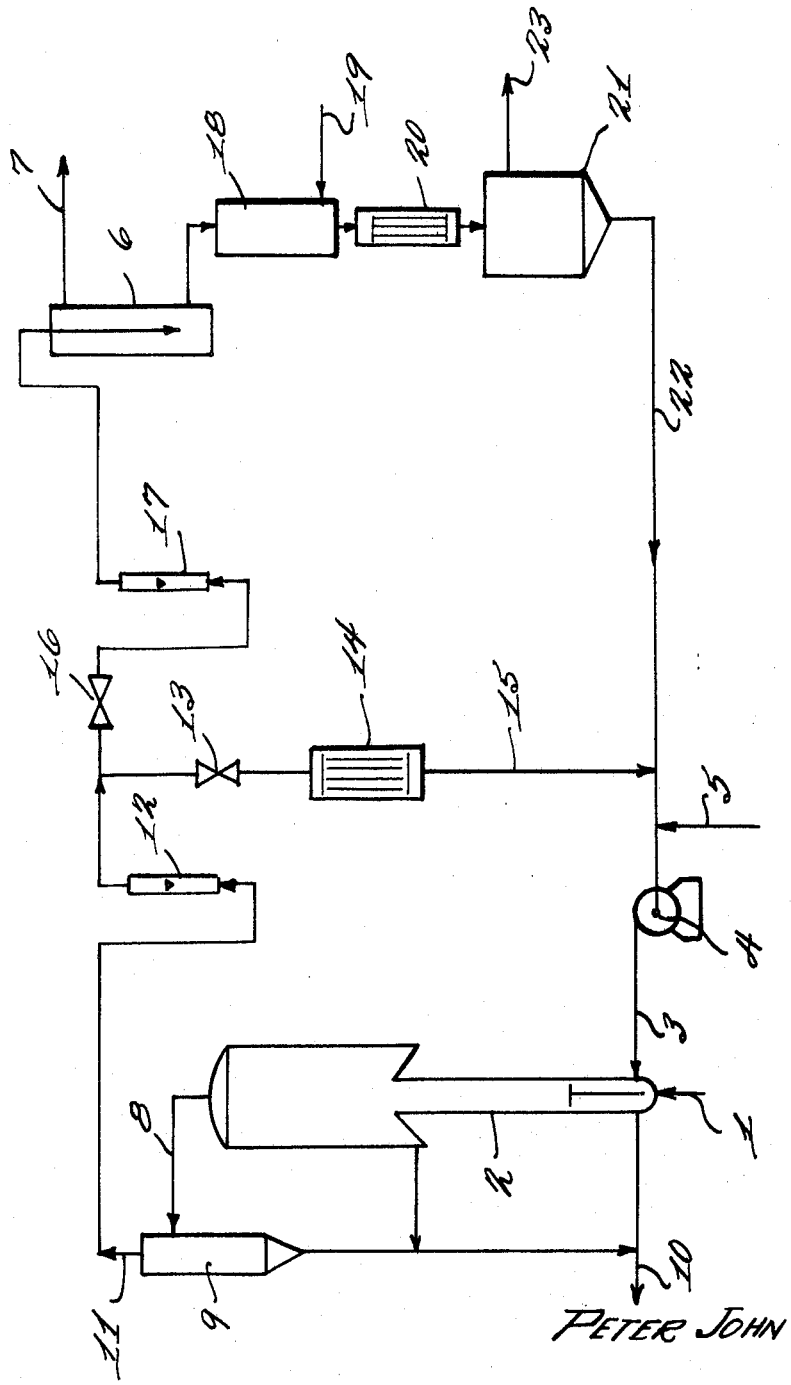

3,479,386
PROCESS FOR THE REDUCTIVE DIMERISATION OF ALPHA,BETA-OLEFINIC NITRILES
Peter John Gregory, Toorak, Victoria, Australia, assignor to Imperial Chemical Industries of Australia and New Zealand Limited, Melbourne, Victoria, Australia, a company of Victoria
Filed Apr. 10, 1967, Ser. No. 629,518
Claims priority, application Australia, Apr. 18, 1966, 4,351/66
Int. Cl. C07c *121/20, 121/32*
U.S. Cl. 260—465.8      11 Claims

ABSTRACT OF THE DISCLOSURE

A process of continuous reductive dimerisation of alpha,beta-olefinic nitriles and esters of aliphatic alpha, beta-olefinic carboxylic acids and alpha,beta-olefinic carboxamides under steady state conditions in an aqueous medium providing reactive hydrogen by reacting a metal amalgam with said medium in the presence of alkylated cations wherein the aqueous phase contains a quantity of sodium bicarbonate in excess of that required to convert all of the sodium reacted in the reactor to sodium carbonate, and the sodium taken up during the reaction is precipitated with $CO_2$ as sodium bicarbonate outside the reactor.

---

This invention relates to a process of reductive dimerisation of compounds which are acceptors in Michael reactions, especially alpha, beta-olefinic nitriles.

In copending U.S. application Ser. No. 446,430, there is described a process of reductive dimerisation of olefinic compounds selected from the group consisting of alpha, beta-olefinic nitriles and esters of aliphatic alpha,beta-mono-olefinic carboxylic acids in the absence of an external electrical circuit wherein the reductive dimerisation is carried out in a medium capable of providing reactive hydrogen by reacting a metal amalgam selected from the group consisting of alkali and alkaline earth metal amalgams with said medium in the presence of at least one salt capable of forming alkylated cations in said medium. The medium, the amalgam, the salt capable of forming alkylated cations and the reaction conditions are defined in said application. A particularly preferred reaction is the hydrodimerisation of acrylonitrile to adiponitrile. A preferred method of maintaining the pH below the point at which the undesired cyanoethylation reaction of acrylonitrile occurs, namely a pH below 9.5, according to said application comprises neutralising the sodium hydroxide formed in the reaction with carbon dioxide. During the neutralisation sodium bicarbonate is formed and precipitated in the reactor in the presence of the organic and the amalgam phases; this has some disadvantages. Sodium bicarbonate may get entrained in the reacted mercury and must subsequently be removed—usually discarded—in a further washing step; small amounts of mercury are adsorbed onto and/or occluded in the solid sodium bicarbonate and need to be separated from it subsequently because of both its high economic value and its toxicity and in the presence of organic substances the sodium bicarbonate is precipitated in the form of very fine particles which are relatively difficult to filter.

We have now found that these difficulties can be overcome if the differential between saturation concentration of the aqueous phase in respect of sodium bicarbonate and the minimum concentration of sodium bicarbonate in the reactor at which the undesired cyanoethylation reaction can be suppressed is utilised to remove the sodium fed to the system by converting it in the reactor, without precipitation of solids, to sodium carbonate and then precipitating it in the form of sodium bicarbonate outside the reactor.

Accordingly, in the broadest sense, we provide an improved process of continuous reductive dimerisation of compounds which are acceptors in Michael reactions, especially alpha,beta-olefinic nitriles, esters of aliphatic alpha,beta-olefinic carboxylic acids and alpha,beta-olefinic carboxamides wherein the reductive dimerisation is carried out under steady state conditions in an aqueous medium capable of providing reactive hydrogen by reacting a metal amalgam selected from the group consisting of alkali and alkaline earth metal amalgams with said aqueous medium in the presence of at least one salt capable of forming alkylated cations in said medium, characterised in that the aqueous phase which is fed to the hydrodimerisation reactor contains a quantity of sodium bicarbonate in excess of that required to convert all of the sodium reacted in the reactor to sodium carbonate, said excess being such that the resultant pH throughout the reactor is kept below a value at which the undesired cyanoethylation reaction occurs and characterised further in that a quantity of sodium equal to the sodium taken up during the reaction by conversion of sodium bicarbonate to sodium carbonate is precipitated in the form of sodium bicarbonate outside the hydrodimerisation reactor by treating at least part of the aqueous phase of the reaction product stream with carbon dioxide.

By the term "acceptors in Michael reactions" we mean compounds containing a group of general formula

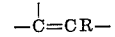

in which the R group activates the double bond. Examples of such compounds are listed in "Organic Name Reactions" by Krauch and Kunz 1964, John Wiley and Sons, p. 315, and in "Name Reactions in Organic Chemistry" by Surrey 1961, Academic Press on pp. 173 and 174. Such compounds are referred to hereinafter as "Michael Acceptors."

Our preferred Michael Acceptors are the acrylonitriles including substituted acrylonitriles bearing an alkyl substituent having up to 4 carbon atoms on the alpha or beta carbon atoms joined by the double bond. Our most preferred nitrile is (unsubstituted) acrylonitrile itself. Whenever we subsequently refer to acrylonitrile this is by way of convenient exemplification of the invention by the most typical representative of the class and is not to be construed as a limitation.

Within the above defined limitation on pH control the concentration of sodium bicarbonate in the feed is not narrowly critical; in steady state operation sodium bicarbonate concentrations at or just below the saturation point of the aqueous phase are preferred but lower concentrations are clearly operative. The pH of aqueous bicarbonate solutions saturated at 30° C. is about 8.3 and varies slightly, in a known manner, with temperature and the presence of organic substances in the aqueous phase; while it is within the invention to use a more acidic aqueous feed containing free carbonic acid, in practice 8.3 is the preferred lower pH limit; since the bulk of the aqueous feed is a recycle as further described below it may contain a residual proportion of sodium carbonate, raising the pH somewhat above said lower limit. It is preferable to keep the sodium carbonate concentration fairly low since a pH as low as possible avoids cyanoethylation and increases the ability of the system to take up sodium. A particularly preferred feed is 90 to 100% saturated with respect to sodium bicarbonate and is less than 0.2 normal with respect to sodium carbonate. The upper pH limit is determined by the level of undesired by-products due to the cyanoethylation reaction, essentially β,β'-oxydipropionitrile, which is economically acceptable. By suppression of the cyanoethylation reaction we therefore mean control within an economically acceptable level. In practice it is considered that a pH of 9.5 is a safe upper limit. It will be understood that in the presence of organic solvents in the aqueous phase, particularly when these are present in high concentrations, the pH may be apparent only; throughout this specification we mean by pH the reading of a Titriskop Type E166 "Metrohm" pH meter using a calomel standard reference electrode and a shielded glass electrode of the "Titron A" type, and standardised against a buffer solution at a pH of 9.22 at 20° C. The term "steady state" throughout this specification includes continuous operation with fluctuations of reaction conditions within the operative ranges stated, as in practice not infrequently minor fluctuations may, in fact, occur. The preferred range of pH over which the reaction of sodium bicarbonate with sodium released from the amalgam occurs on passage through the steady state reactor is therefore from 8.3 to 9.5.

Accordingly we also provide a process of feeding an aqueous medium comprising a Michael acceptor, sodium bicarbonate, a salt capable of yielding alkylated cations as above defined and an alkali metal or alkaline earth metal amalgam to a reactor, reacting said acceptor compound with said amalgam and medium under steady state conditions, while maintaining the pH throughout the reactor between 8.3 and 9.5, treating at least part of the aqueous phase of reaction products leaving said reactor in an external separate vessel with carbon dioxide, separating precipitated sodium bicarbonate and recycling the resultant mother liquor.

It will be understood that under steady state conditions essentially—with only random fluctuations—all of the sodium taken up in the reactor in the aqueous phase is removed in the external carbonating reactor and/or in a heat exchanger, which may be provided to remove the heat of reaction and to compensate for the temperature rise on passage through the reactor. The mother liquor resultant from filtration is practically saturated with sodium bicarbonate; it may contain some residual sodium carbonate as complete conversion to bicarbonate in a carbonating tower is not absolutely necessary and may require uneconomically large carbonating towers. In the next reaction cycle in the hydrodimerisation reactor the sodium bicarbonate concentration is then again reduced by reaction with sodium; sodium carbonate concentration increases accordingly without, however, precipitation of sodium carbonate.

The decrease in concentration of sodium bicarbonate between the aqueous feed stream and the aqueous reaction product exit stream—and the corresponding increase in sodium carbonate—are not narrowly critical; both depend on the feed rate and reaction rate of the amalgam and the recirculation rate of the aqueous medium phase. Operation with a small differential near the lower pH limit, say with a pH of 8.5 in the feed, and of 8.7 in the exit stream, has the advantage of minimising the danger of cyanoethylation, and this is our preferred mode of operation; however, in this case, for a given quantity of amalgam reacted and thereby adiponitrile produced, a larger aqueous phase recirculation is required. This increases pumping costs and, somewhat, the size of the pipes, the carbonating tower and the filtration plant for sodium bicarbonate. A wider differential, say between 8.5 and 9.5, reduces external pipework at the cost of increased by-product formation.

A further feature of our invention comprises cooling at least part of the aqueous reaction product stream after it has left the reactor. Preferably the bulk of the heat of the hydrodimerisation reaction is removed in this manner externally by means of a heat exchanger. We have found that a temperature drop in the order of 5 to 30° C. facilitates precipitation of the sodium bicarbonate. A particular advantage, and this is a further feature of the invention, is that the residence time of the aqueous phase to be cooled can be chosen independently from the residence time in the reactor; consequently slow cooling with continuous seeding and controlled growth of larger sodium bicarbonate crystals is achieved. This greatly facilitates removal of the crystals by hydroclones and/or centrifuges and/or filtration.

The external precipitation of sodium bicarbonate and/or the optional external cooling need not be carried out on the whole of the aqueous recycle phase; only a portion of the recycle stream, a bleed-off needs to be treated with carbon dioxide while the remainder of the aqueous phase may be recycled to the feed stream in a short circuit, provided always that the sodium bicarbonate so removed balances the sodium input in the reactor. The whole or part of the heat of reaction may then be removed from the bleed-off stream; any heat not removed there may be removed in the short-circuit recycle stream or even in the hydrodimerisation reactor itself.

Our invention is particularly suitable for continuous reaction using a turbulent flow reactor, particularly a "fluidised bed" reactor. Operation as above defined in conjunction with these reactors are preferred forms of the invention.

Throughout this specification, the term "aqueous medium" is not limited to water but includes aqueous phases containing organic water-soluble solvents, e.g. dialkylcarboxydiimides e.g. dimethylformamide or dimethylacetamide, sulphoxides and sulphones, e.g. dimethylsulphoxide and sulpholane, acetonitrile and, of course, acrylonitrile and adiponitrile. Water-soluble solvents may be present in high proportions; however, when the water content becomes low, substantially less than the total weight of organic material, the solubility of sodium bicarbonate in the feed decreases and may become the limiting factor for operability of the process because only very small quantities of sodium can then be taken up per pass; in this case we prefer to externally cool the aqueous phase substantially, so as to increase the available bicarbonate content; optionally carbonation of a substantially pre-cooled solution may then also be carried out at least partly inside the hydrodimerisation reactor and high recycle rates are required.

The preferred salts capable of forming alkylated cations are as defined in the above-mentioned U.S. application Ser. No. 446,430; their operative concentration range is also defined there.

Carbonating towers suited for converting sodium carbonate to sodium bicarbonate, heat exchangers suited for cooling of the external circuit and precipitating sodium bicarbonate and means for separating the solid sodium bicarbonate particles, such as hydroclones, centrifuges, super-dehydrators and filters are known in the art.

One specific embodiment of the invention is explained by the attached drawing, FIG. 1, which is a schematic flow diagram.

Sodium amalgam is admitted through line 1 to hydrodimerisation reactor 2. The aqueous phase is fed to reactor 2 through line 3 by means of pump 4. Make-up water, acrylonitrile and aqueous quaternary ammonium salt are added through line 5 to compensate for water and acrylonitrile consumed in the reaction and for the withdrawal of organic reaction products from separator 6 through stream 7. Reaction takes place in the fluid bed reactor 2 without precipitation and the reaction product exit stream then passes through line 8 to hydroclone 9 where any entrained mercury is separated and then removed through line 10 together with spent amalgam from the reactor. The reaction product exit stream continues along line 11 through flowmeter 12. A controllable portion of this stream is recycled to the reactor through valve 13, heat exchanger 14 and line 15. A regulated portion, however, (optionally the whole of the reactor exit stream) is drawn off by adjusting valve 16 and passes through flowmeter 17 to the separator 6 where the organic reaction products and recycle of unreacted organic feed are separated from the aqueous phase and drawn off through line 7. From the separator the aqueous phase is fed to carbonating tower 18 into which carbon dioxide is injected through line 19, thus converting sodium carbonate back to sodium bicarbonate. Following this the slurry is cooled in heat exchanger 20 and the crystals of sodium bicarbonate formed in 19 and 20 are filtered off in centrifuge 21. Optionally a hydroclone, not shown, concentrating the slurry may be interposed between heat exchanger 20 and centrifuge 21. The overflow from this hydroclone would then by-pass the centrifuge into line 22 and the underflow would be fed to centrifuge 21. The filtered off sodium bicarbonate is removed at 23 whilst the filtrate is recycled to the process along line 22.

Our invention is now illustrated by, but not limited to, the following examples in which all parts, unless otherwise stated, are by weight.

EXAMPLE 1

Example 1 demonstrates the invention using a relatively small differential in pH between aqueous feed to and aqueous exit stream from the reactor, operating near the upper limit of desirable pH concentrations and using only a portion of the exit stream for carbonation.

The experimental fluid bed reactor was operated at steady state conditions in a circuit as shown in FIG. 1, the description of which is given in the body of this specification.

An aqueous reactant solution containing 2% trimethylcetylammonium bromide and the following amounts of organic materials:

| | Percent w./v. |
|---|---|
| Acrylonitrile | 2.20 |
| Adiponitrile | 2.33 |
| Propionitrile | 0.27 |
| Hydrooligomers of acrylonitrile and a small amount of oxydipropionitrile | 0.19 | was admitted to reactor 2 at the rate of 1 gal./min. together with a feed of 85 ml./min. of sodium amalgam containing 0.3% w./w. sodium. Sodium conversion within the reactor was 100%.

The reaction product exit solution from the reactor, at 42° C., was found to be 0.898 normal with respect to sodium carbonate and 0.900 normal with respect to sodium bicarbonate; the apparent pH was 9.5; it was measured on a standard Titriskop Type E166 "Metrohm" pH meter, using a standard "Titron A" type shielded glass electrode, in conjunction with a standard calomel reference electrode; the pH meter was standardised against a buffer solution at a pH of 9.22 at 20° C.

While the bulk of the reaction product exit stream 11 (FIG. 1) was recirculated to feed stream 3 through by-pass valve 13 and heat exchanger 14 (FIG. 1) 183 ml./min. of the reaction product stream was purged off through valve 16. The organic reaction product phase was separated in separator 6, removed through line 7, and the aqueous phase was passed through the carbonating tower 18. Sufficient carbon dioxide was injected to convert the sodium carbonate formed from the sodium released in the reactor into sodium bicarbonate and to precipitate it in this form in vessels 18 and 20.

The solution was then cooled to 22.5° C. in heat exchanger 20 and the solid precipitated sodium bicarbonate was filtered off in centrifuge 21. On analysis the filtrate was found to have 0.116 normality with respect to sodium carbonate and 0.798 normality with respect to sodium bicarbonate. It had an apparent pH of 8.40 measured as described above. The filtrate was then re-combined with the main recycle stream 15 and recycled through line 3 to the reactor.

The organic phase withdrawn through line 7 was balanced by an equivalent rate of addition of acrylonitrile, viz. 12.5 ml./min. Water was added to the system at the rate of 5.7 ml./min. to compensate for usage in the reaction, loss in the sodium bicarbonate cake and removal in the organic phase.

The recycle stream 15 was cooled from 42.1° C. to 40.7° C. in heat exchanger 14. The organic phase withdrawn through line 7 had the following composition:

| | Percent w./v. |
|---|---|
| Acrylonitrile | 22.80 |
| Adiponitrile | 53.00 |
| Propionitrile | 2.50 |
| Hydrooligomers | 6.89 |
| Trimethylcetylammonium bromide | 3.38 |
| Water | 5.10 |
| Sodium bicarbonate | 0.12 |

The yield based on acrylonitrile was as follows:

| | Percent |
|---|---|
| Adiponitrile | 85 |
| Propionitrile | 4 |
| Hydrooligomers and oxydipropionitrile | 11 |

EXAMPLE 2

Example 2 demonstrates operation at the lower end of the operative pH range of the reactor with precipitation of sodium bicarbonate outside the reactor by carbonating the whole of the recycle stream.

The experimental "fluid bed" reactor as described above was operated at steady state conditions as in Example 1 but with the whole of the recycle stream passing through the carbonating tower. This was achieved by shutting valve 13 and opening valve 16 shown in FIG. 1.

An aqueous feed containing

| | Percent w./v. |
|---|---|
| Trimethylcetylammonium bromide | 2 |
| Acrylonitrile | 2.24 |
| Adiponitrile | 2.30 |
| Propionitrile | 0.26 |
| Hydrooligomers of acrylonitrile | 0.14 | was admitted to the reactor at the flow rate of 1 gal./min., together with a feed of 85 ml./min. of sodium amalgam containing 0.3% w./w. sodium. Sodium conversion within the reactor was 100%.

The reaction product exit stream from the reactor was at 42.1° C. and was found to be 1.047 normal with respect to sodium bicarbonate and 0.126 normal with respect to sodium carbonate corresponding to an apparent pH of 8.58. Separation of the organic phase formed took place in the separator. The composition of the organic phase was substantially the same as Example 1. Precipitation of sodium bicarbonate in the carbonating tower by injection of $CO_2$ with subsequent cooling to 40° C. followed by centrifuging resulted in a filtrate which was 1.080 normal with respect to sodium bicarbonate and 0.060 normal with respect to sodium carbonate; its apparent pH was 8.50. The filtrate was recycled to the reactor.

Yields on acrylonitrile were 84.5% to adiponitrile, 4.1% to propionitrile, and 10.4% to hydrooligomers; no trace of oxydipropionitrile could be determined.

I claim:

1. In a continuous process for the reductive dimerisation of a Michael acceptor selected from acrylonitrile or a lower alkyl substituted acrylonitrile to obtain adiponitrile or a lower alkyl substituted adiponitrile, respectively, wherein said acceptor is continuously supplied to a reactor along with an aqueous dimerisation medium containing an onium salt providing alkylated onium cations and contacted therein with sodium amalgam to reductively dimerise said acceptor and simultaneously convert sodium to sodium ions, the sodium ions are neutralised so that the resultant pH throughout the reactor is kept below 9.5 and reaction mixture comprising dimerised product phase and aqueous phase containing the neutralized sodium ions is withdrawn from the reactor, the improvement which comprises the steps of including sodium bicarbonate in the aqueous medium fed to said reactor, the bicarbonate being present in an amount in excess of that necessary to convert all of the reacted sodium to sodium carbonate, the excess being such that the resultant pH in the reactor does not exceed 9.5 and precipitating an amount of sodium bicarbonate equivalent in sodium content to that converted to carbonate in the reactor by contacting the aqueous phase of the withdrawn reaction mixture with carbon dioxide.

2. A process according to claim 1 wherein the acceptor is acrylonitrile.

3. A process according to claim 1 wherein the aqueous medium is from 90% to 100% saturated with respect to sodium bicarbonate and is less than 0.2 normal with respect to sodium carbonate.

4. A process according to claim 1 wherein the pH is maintained between 8.5 and 9.5.

5. A process according to claim 1 wherein the pH is maintained between 8.5 and 8.7.

6. A process according to claim 1 characterized in that at least a substantial part of the aqueous phase of reaction products is cooled after it has left the reactor.

7. A process according to claim 1 characterized in that at least a substantial part of the aqueous phase of reaction products is cooled to a temperature which is from 5° C. to 30° C. below the temperature of the reactor-exit product stream.

8. A process according to claim 1 characterized in that the process is performed in a continuous manner in a turbulent flow reactor.

9. A process according to claim 1 wherein the medium is water or water together with an organic, water soluble solvent.

10. A process according to claim 1 wherein the aqueous medium comprises an organic water soluble solvent selected from the group consisting of dialkylcarboxydiimides, sulphoxides, sulphones and acrylonitrile.

11. A process according to claim 1 wherein the aqueous medium comprises an organic water soluble solvent selected from the group consisting of dimethylformamide, dimethylacetamide, dimethylsulphoxide, sulpholane, acetonitrile, and adiponitrile.

References Cited

UNITED STATES PATENTS 3,193,574 7/1965 Katchalsky et al. ___ 260—465.8
3,356,708 12/1967 Davies et al. _____ 260—465.8

JOSEPH P. BRUST, Primary Examiner

U.S. Cl. X.R.

260—465.6, 485, 561